(12) United States Patent
Merminod et al.

(10) Patent No.: US 6,326,949 B1
(45) Date of Patent: Dec. 4, 2001

(54) WHEEL SUPPORT GUIDE FOR VERTICAL WHEEL SUPPORT MOVEMENT

(75) Inventors: Antoine A. Merminod, Cully; Marc A. Bidiville, Pully, both of (CH); Alex Sung, Hsinchu (TW)

(73) Assignee: Logitech Europe S.A., Romanelsur Morges (CH)

( * ) Notice: Subject to any disclaimer, the term of this patent is extended or adjusted under 35 U.S.C. 154(b) by 0 days.

(21) Appl. No.: 09/265,869

(22) Filed: Mar. 11, 1999

(51) Int. Cl.$^7$ .................................................... G09G 3/12
(52) U.S. Cl. ............................................. 345/163; 345/156
(58) Field of Search ....................... 345/163, 156

(56) References Cited

U.S. PATENT DOCUMENTS

| | | |
|---|---|---|
| 4,464,652 | 8/1984 | Lapson et al. . |
| 4,712,101 | 12/1987 | Culver .................... 340/710 |
| 4,928,093 | 5/1990 | Rahman . |
| 4,952,919 | 8/1990 | Nippoldt . |
| 5,095,303 | 3/1992 | Clark et al. ............ 340/710 |
| 5,161,313 | 11/1992 | Rijlaarsadarm . |
| 5,298,919 | 3/1994 | Chang .................... 345/163 |
| 5,313,230 | 5/1994 | Venolia et al. ......... 345/163 |
| 5,446,481 | 8/1995 | Gillick et al. .......... 345/163 |
| 5,473,344 | 12/1995 | Bacon et al. ........... 345/163 |
| 5,530,455 | 6/1996 | Gillick et al. .......... 345/163 |
| 5,557,440 | 9/1996 | Hanson et al. . |
| 5,712,725 | 1/1998 | Faltermeier et al. . |
| 5,771,038 | 6/1998 | Wang ..................... 345/163 |
| 5,790,098 | 8/1998 | Lin ......................... 345/164 |
| 5,808,568 | 9/1998 | Wu ......................... 341/20 |
| 5,828,364 | 10/1998 | Siddiqui ................ 345/163 |
| 5,912,661 | 6/1999 | Siddiqui ................ 345/166 |

FOREIGN PATENT DOCUMENTS

| | | |
|---|---|---|
| 273912 | 1/1996 | (CN) . |
| 3610501A1 | 10/1986 | (DE) . |
| 44 05 314C1 | 6/1995 | (DE) . |
| 296 17 123U1 | 10/1996 | (DE) . |
| 297 01 466U1 | 1/1997 | (DE) . |
| 297 16 864U1 | 9/1997 | (DE) . |
| 0531829A1 | 3/1993 | (EP) ................... H03J/9/06 |
| 2 309 507A | 1/1996 | (GB) . |
| 2 321 692A | 1/1997 | (GB) . |
| 60-175137 | 9/1985 | (JP) . |
| 63-216224 | 9/1988 | (JP) . |
| 63-199335 | 12/1988 | (JP) . |
| 2-235131 | 9/1990 | (JP) . |
| 3-90338 | 9/1991 | (JP) . |
| 4-186417 | 7/1992 | (JP) . |
| 5-113852 | 5/1993 | (JP) . |

(List continued on next page.)

*Primary Examiner*—Steven Saras
*Assistant Examiner*—Uchendu O. Anyaso
(74) *Attorney, Agent, or Firm*—Townsend and Townsend and Crew LLP

(57) ABSTRACT

A roller wheel structure having a simplified design. A support guide is connected to a lower housing for constraining and allowing movement of a roller wheel and roller support. In a preferred embodiment, the support guide is integrally formed with the lower housing, reducing the part count and enabling a more compact design. On one side of the wheel, the support guides connected to the lower housing support a spring around an axle connected to a support for the roller wheel. When the roller wheel is depressed by a user, the spring allows the roller support to depress until a micro-switch is activated. On a second side of the roller wheel, the roller support consists of a mechanism which slides up and down within the support guides connected to the lower housing when the user depresses the roller wheel. This side includes a spring biased against an open inside of the roller wheel. The spring is biased against an undulating surface on the inside perimeter of the wheel, providing a ratcheting effect when a user rotates the wheel.

16 Claims, 2 Drawing Sheets

FOREIGN PATENT DOCUMENTS

| | | |
|---|---|---|
| 5-55431 | 7/1993 | (JP) . |
| 6-250781 | 9/1994 | (JP) . |
| 10-149745 | 11/1996 | (JP) . |
| 10-177831 | 12/1996 | (JP) . |
| 3039992 | 1/1997 | (JP) . |
| 10-326144 | 5/1997 | (JP) . |
| 10-340158 | 6/1997 | (JP) . |
| 3050051 | 12/1997 | (JP) . |
| 095299 | 1/1988 | (TW) . |
| 148492 | 12/1990 | (TW) . |
| 220410 | 10/1991 | (TW) . |
| 210764 | 8/1993 | (TW) . |
| 264074 | 11/1995 | (TW) . |
| 308680 | 3/1996 | (TW) . |
| 273912 | 4/1996 | (TW) . |
| 278078 | 6/1996 | (TW) . |
| 281325 | 7/1996 | (TW) . |
| 315011 | 12/1996 | (TW) . |
| 207518 | 2/1997 | (TW) . |
| 316696 | 3/1997 | (TW) . |

WHEEL SUPPORT GUIDE FOR VERTICAL WHEEL SUPPORT MOVEMENT

BACKGROUND OF THE INVENTION

The present invention relates to computer mice or track balls, and in particular to those including a roller.

In one type of computer mouse, a ball protrudes from the bottom of the mouse housing, and rolls across a supporting surface. The movement of the ball is typically detected by shafts which are in contact with the ball and turn an encoder wheel having a number of slots. An LED is on one side of the encoder wheel, and a detector on the other, so that the turning of a encoder wheel, corresponding to the movement of the ball in one direction, can be detected by the intensity of light when it shines through a slot, and is subsequently blocked between slots. Track balls will have a ball mounted on the top with the housing being stationary, but similarly operate with two encoder wheels at 90° angles to detect X and Y movement. Optical mice and trackballs have also been developed.

Such mice and track balls typically also have buttons which can be depressed or clicked by a user, and which depress a microswitch. These provide additional inputs to the computer, in addition to the position of the mouse or trackball. Some mouse designs have added a roller or wheel which can be used for such functions as scrolling or zooming. The roller is operated by a user finger much like a dial on a radio.

One roller design is shown in U.S. Pat. No. 5,298,919 assigned to Multipoint Technology Corporation. This has a user operable roller which has a shaft extending out from it, and an encoder wheel attached to the shaft. The encoder wheel is like the optical encoders used on the mice or trackball balls. Microsoft U.S. Pat. No. 5,473,344 shows a design similar to the Multipoint one in which a shaft from the roller is connected to a separate optical encoder wheel. One Microsoft product has a shaft supporting the roller and encoder wheel, with the shaft being itself mounted on forks extending up from the lower housing of the mouse through openings in a circuit board.

Another design is shown in U.S. Pat. No. 5,313,230 assigned to Apple Computer. This shows two finger rollers with a shaft which drives a belt which is connected to a pulley on a separate encoder. A similar pulley system is shown in U.S. Pat. No. 5,530,455 assigned to Mouse Systems.

Yet another design is shown in U.S. Pat. No. 5,446,481 assigned to Mouse Systems. In this design, the roller has a shaft attached to a gear outside the roller, which drives an optical encoder wheel with the gear.

In addition to the rollers being turnable, a number of designs allow the roller itself to actuate a switch. In Microsoft U.S. Pat. No. 5,473,344, this is done with a roller which pivots inward under pressure from the finger, in addition to rolling about its axis. When pivoted inward, it will depress a microswitch to send an activation signal to the computer. Mouse Systems U.S. Pat. No. 5,530,455 shows a design in which the entire housing for the roller is depressed against supporting springs, and when depressed actuates an underlying microswitch.

U.S. Pat. No. 5,095,303 to Apple Computer shows a graphic controller with three dials, with at least one of the dials shown with an encoder ring and detectors, with the detectors being shown on either side of the dial in one drawing. However, unlike some of the designs discussed above, the dials are on a fixed axis and cannot be depressed to actuate a microswitch and provide another input signal.

A roller design having slots in the roller wheel itself is shown in Primax Electronics' U.S. Pat. No. 5,808,568. That patent also shows a support for the wheel which pivots with the wheel to depress a switch. A related application of the Assignee of this application is entitled "Optical Mechanical Roller With Ratchet", filed Oct. 14, 1997, application Ser. No. 08/949,681. That application shows a roller with integral slots which moves up and down relative to an aligned light emitter and detector.

SUMMARY OF THE INVENTION

The present invention provides a roller wheel structure having a simplified design. Support columns constrain and allow movement of a roller wheel and roller support.

In a preferred embodiment, the support columns are integrally formed with the lower housing, reducing the part count and enabling a more compact design. On one side of the wheel, the support columns extend from the lower housing to support the ends of a lift spring. The center of the lift spring is wound around an axle connected to a support for the roller wheel. When the roller wheel is depressed by a user, the lift spring allows the roller support to depress until a micro-switch is activated. On a second side of the roller wheel, the roller support consists of a mechanism which slides up and down within the support columns connected to the lower housing when the user depresses the roller wheel. Here, the support columns act as guides for the vertically moving roller support. This side includes a ratchet spring biased against an open inside of the roller wheel. The ratchet spring is biased against an undulating surface on the inside perimeter of the wheel, providing a ratcheting effect when a user rotates the wheel.

For a further understanding of the nature and advantages of the invention, reference should be made to the following description taken in conjunction with the accompanying drawings.

DESCRIPTION OF THE SPECIFIC EMBODIMENTS

Figure 1A:
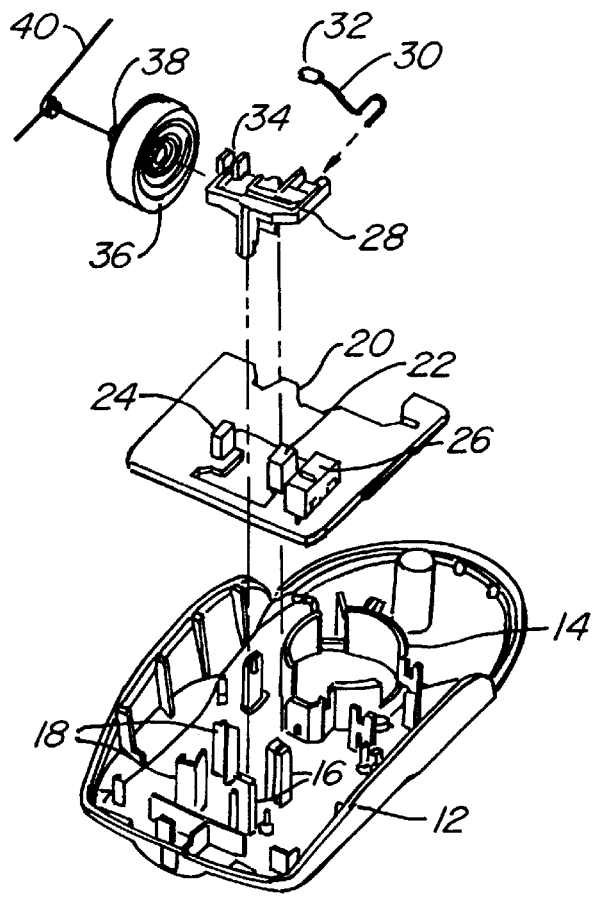
FIGS. 1A and 1B are exploded and assembled views of the lower housing of a mouse incorporating the present invention.
Figure 1B:
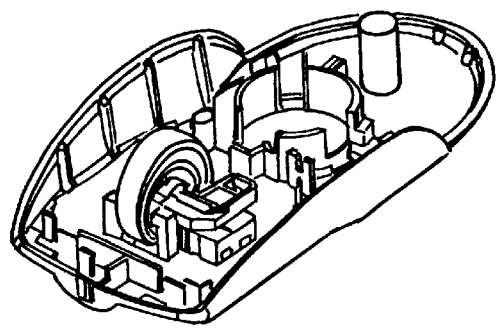

FIG. 1A is an exploded view of the bottom housing of a mouse incorporating an embodiment of the present invention. FIG. 1B shows the components of FIG. 1A assembled. FIG. 1A has a lower mouse housing 12 which includes a ball cage 14 for restraining a mouse ball. Projecting from the lower housing are a pair of guide columns 16 and a pair of support columns 18. The columns extend through a hole in a circuit board 20 as indicated by dotted lines. Mounted on the circuit board is an emitter in the form of a light emitting diode (LED) 22. Also mounted on a circuit board is a light detector chip 24 mounted on the opposite side of the hole in the circuit board. Also included on the circuit board is a micro-switch 26.

A ratchet support 28 has edges which slide into guiding columns 16 as illustrated by the dotted line. A ratchet spring 30 mounts on ratchet support 28 with an end 32 of the ratchet spring positioned on an end 34 of support 28 so that it can contact the inside rim of roller wheel 36. Roller wheel 36 consists of a wheel mounted around an internal piece of plastic having an axle 38 on one side, and internally having an open side opposite axle 38, with saw-tooth protrusions around the inside perimeter. The saw-tooth protrusions engage with ratchet spring 32, so that a ratchet force is felt when the wheel is rotated by virtue of the spring action moving across the saw-tooth edges. The roller wheel is supported by a roller support comprising both ratchet support 28 on one side and axle 38 on the other side.

A lift spring 40 has a center, wound portion for engaging axle 38, and extending ends which are mounted on support columns 18.

Figure 2:
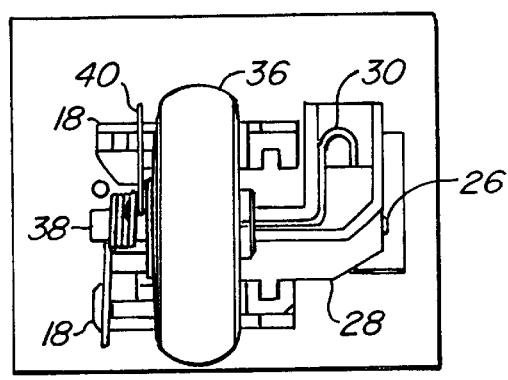
FIG. 2 is a top view of the roller mechanism of FIG. 1.
Figure 3:
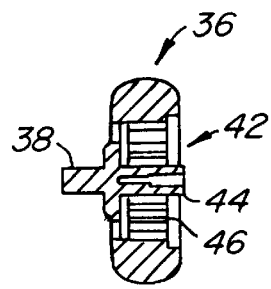
FIG. 3 is a side cut away view of the roller wheel of FIG. 2.
Figure 5:
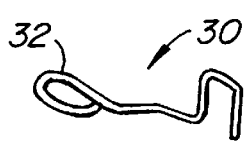
FIG. 5 is a view of the ratchet spring of FIG. 2.
Figure 6:
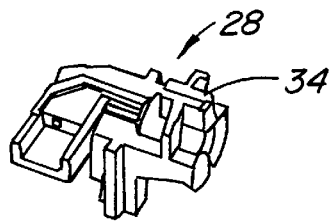
FIG. 6 is a perspective view of the roller support piece for the ratchet spring of FIG. 2.

FIG. 2 is a top view of the roller mechanism. Roller wheel 36 is in the center, and is illustrated in a cut-away view in FIG. 3. As shown in FIG. 3, axle 38 extends outward on one side, while there is a circular opening 42 on the other side. Extending from the center of the circular opening is a shaft 44 for engaging with roller support 28. On the inside periphery can be seen a number of saw-tooth edges 46. These engage with looped end 32 of ratchet spring 30 as shown in more detail in FIG. 5. The loop engages with teeth 46 on the inside of the drum of the roller wheel, to provide the ratchet force.

Figure 4:
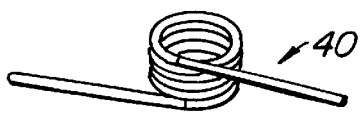
FIG. 4 is a view of the lift spring of FIG. 2.

Lift spring 40 is shown in more detail in FIG. 4. It has a central wound portion which goes around axle 38 as illustrated in FIG. 2. The two ends rest on the tops of guide columns 18 in slots on the top of those guide columns. This spring adds its actuation force to the actuation force of the micro-switch to increase the force needed to activate the micro-switch 26. Usual friction of the finger on the wheel requires a pressure (1N) up to five times the tangential force required to rotate the wheel (0.22N=22 g). The typical switch actuation force is 0.75N=75 g and the lift spring increases it to get a final wheel switch actuation force of approximately 1.5N (=150 g). Spring 40 in FIG. 4 preferably has 7.5 turns, and is wound to have a diameter larger than the shaft 38. This allows shaft 38 and the roller wheel 36 to rotate freely without being inhibited by the spring. The typical maximum force exerted by ratchet spring 30 to create the ratchet effect is 0.22N=22 g.

In use, when a user turns roller wheel 36, ratchet spring moves up and down across the sawtooths 46, giving a ratchet feel to the user. As the roller wheel is rotated, the light from the LED 22 is alternately blocked, then detected by detector 24 as the light passed through the slots. Because the LED and detector are at the horizontal center of the wheel, a slot stays aligned with the LED and detector even as the roller wheel is depressed by a user to activate the microswitch. This avoids noise which could cause undesired movement of the cursor upon a depression of the roller wheel.

When the user depresses the roller wheel, the wheel pushes against lift spring 40 on one side. On the other side, ratchet support 28 slides downward, guided by guide columns 16, until microswitch 26 is activated.

Figure 7:
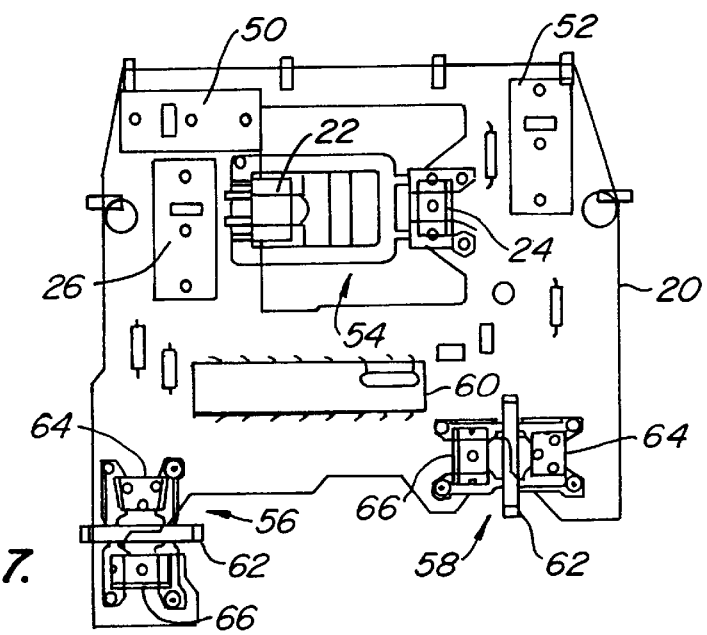
FIG. 7 is a diagram illustrating the placement of different components on a computer mouse housing of FIGS. 1A and 1B, including the emitter and detector.

FIG. 7 illustrates the layout of circuit board 20. Shown is the location of micro-switch 26, along with additional micro-switches 50 and 52, which can be activated by buttons on the upper housing of the mouse adjacent the roller. Also shown in FIG. 7 is the LED 22 and the photodetector 24 which are mounted on opposite sides of the roller wheel.

Opening 54 allows the guide and support columns to pass through for mounting of the roller and roller support. Also shown are emitter/detector pairs 56 and 58 for the encoder wheels used for the X and Y directions of a ball for the mouse movement itself.

LED 22 and light emitters 24 are fixed on the circuit board to the lower housing, and remain stationary when the roller wheel and support are depressed. Thus, they are axially aligned with center of the roller wheel so that a particular slot can move vertically up and down without inducing noise by virtue of the emitter and detector position with respect to the slot varying as a result of the vertical movement.

The formation of ball cage 14 as part of the lower mouse housing is shown in more detail in U.S. Pat. No. 5,670,690. A preferred technique for the light emitter 22 using the slots in the wheel with an optical barrier is set forth in U.S. Pat. No. 5,680,157, the disclosure of which is incorporated herein by reference.

Also shown in FIG. 7 is a processor chip 60. In addition, the encoder wheels 62 for the mouse ball are shown. The encoders wheels are connected to shafts (not shown) which are biased against the mouse ball (not shown) in a well-known manner. LEDs 64 and detectors 66 provide the light signals through encoder wheels 62. Also shown but not labelled in FIG. 7 are several resistors and capacitors mounted on the circuit board. As can be seen, one of the advantages of the small footprint of the roller wheel mechanism, and the unique layout of the components on the circuit board, is that the circuit board can fit entirely on one side of the ball cage, as can be seen in FIGS. 1A and 1B.

As will be understood by those of skill in the art, the present invention could be embodied in other specific forms without departing from the essential characteristics thereof. For example, the guide columns could be mounted on the circuit board rather than as part of the lower housing. Alternately, the roller wheel could have a single axle mounted on the guide columns, with a slot in the columns allowing depression and a coil spring below it providing the activation force. The ratchet effect could be provided in other ways. For example, cylindrical axle guides could extend into the wheel to a central axle, with the spring mounted on the axle guides and biased against a sawtooth drum.

Also, other encoding mechanisms than optical could be used for the roller. For example, magnetic encoding could be used, such with Hall sensors and magnetic plastics for the encoding wheel. The switch could be of any type, such as optical or magnetic. Instead of a microswitch, a rubber domed or any other type of switch could be used. Accordingly, the foregoing description is intended to be illustrative, but not limiting, of the scope of the invention which is set forth in the following claims.

What is claimed is:

1. A pointing device for a computer, comprising:

a lower housing;

an upper housing connected to said lower housing, said upper housing having a slot;

a roller wheel extending partially through said slot in said upper housing;

a roller support for rotatably supporting said roller wheel;

a support guide, connected to one of said lower and upper housings, for constraining said roller support to allow vertical movement of said roller support and roller wheel together in response to activation by a user's finger on said roller wheel;

a sensor configured to detect rotation of said roller wheel; and a switch mounted to be activated by said vertical movement of said roller support and said roller wheel, wherein said roller support further comprises:

a drum having said first axle extending from a first side, having an open second side, and having an undulating inside surface around an inside perimeter of said drum;

a second axle extending from said first side into an interior of said drum toward said open second side;

a ratchet support having a first side for engaging said second axle, said ratchet support engaging said support guide; and a ratchet spring having a first side connected to said ratchet support and a second side biased against said undulating inside surface of said drum.

2. The pointing device of claim 1 wherein said support guide is integrally formed as part of said lower housing.

3. The pointing device of claim 1 further comprising:

a spring support connected to said lower housing; and a lift spring mounted between said spring support and said roller support.

4. The pointing device of claim 3 wherein said roller support comprises:

a first axle on a first side of said roller support for engaging with said spring.

5. The pointing device of claim 1 further comprising:

a plurality of slots in said roller wheel; and wherein said sensor comprises an emitter and a detector mounted on opposite sides of said roller wheel at a horizontal midpoint of said roller wheel.

6. The pointing device of claim 1 wherein said support guide comprises at least two columns.

7. The pointing device of claim 1 wherein said pointing device is a mouse or trackball.

8. A pointing device for a computer, comprising:

a lower housing;

an upper housing connected to said lower housing, said upper housing having a slot;

a roller wheel extending partially through said slot in said upper housing;

a drum supporting said roller wheel, said drum having a first axle extending from a first side, having an open second side, and having an undulating inside surface around an inside perimeter of said drum;

a second axle extending from said first side into an interior of said drum toward said open second side;

a ratchet support having a first side for engaging said second axle;

a ratchet spring having a first side connected to said ratchet support and a second side biased against said undulating inside surface of said drum; and sensor configured to detect rotation of said roller wheel.

9. The pointing device of claim 8 further comprising a support guide, connected to one of said lower and upper housings, for constraining said ratchet support to allow vertical movement of said ratchet support.

10. The pointing device of claim 9 further comprising a switch mounted to be activated by said vertical movement of said ratchet support.

11. The pointing device of claim 9 wherein the support guide is integrally formed as part of said lower housing.

12. The pointing device of claim 9 wherein said support guide comprises at least two columns.

13. The pointing device of claim 8 further comprising:

a spring support connected to said lower housing; and a lift spring mounted between said spring support and said first axle.

14. The pointing device of claim 8 wherein said roller wheel includes a plurality of slots, and wherein said sensor comprises an emitter and a detector mounted on opposite sides of said roller wheel.

15. The pointing device of claim 8 wherein said pointing device is a mouse.

16. The pointing device of claim 8 wherein said pointing device is a trackball.

* * * * *